(12) United States Patent
Yabushita et al.

(10) Patent No.: US 8,261,392 B2
(45) Date of Patent: Sep. 11, 2012

(54) SOLE AND METHOD OF MANUFACTURING SOLE

(75) Inventors: Yoshihiro Yabushita, Osaka (JP); Akihiro Miyauchi, Osaka (JP); Takeshi Takeshita, Osaka (JP)

(73) Assignee: Mizuno Corp., Osaka (JP)

( * ) Notice: Subject to any disclaimer, the term of this patent is extended or adjusted under 35 U.S.C. 154(b) by 183 days.

(21) Appl. No.: 12/633,161

(22) Filed: Dec. 8, 2009

(65) Prior Publication Data

US 2010/0146823 A1   Jun. 17, 2010

(30) Foreign Application Priority Data

Dec. 11, 2008  (JP) ................................ 2008-315910
Nov. 9, 2009   (JP) ................................ 2009-255942

(51) Int. Cl.
*A43D 8/00* (2006.01)

(52) U.S. Cl. ............... 12/146 BP; 12/146 BR; 264/244; 264/250; 264/251; 264/254; 264/260; 264/265; 428/423.9; 428/424.7; 428/424.8; 428/492; 428/517; 428/519; 428/521; 156/242; 156/245; 156/273.3; 156/307.3; 427/302; 427/316; 427/322; 427/412.4

(58) Field of Classification Search ............... 428/423.9, 428/424.7, 424.8, 492, 517, 519, 521; 12/146 BP, 12/146 BR; 156/242, 245, 273.3, 307.3; 264/244, 250, 254, 260, 265; 427/302, 316, 427/322, 412.4
See application file for complete search history.

(56) References Cited

U.S. PATENT DOCUMENTS

| | | | |
|---|---|---|---|
| 4,757,095 A * | 7/1988 | Galan et al. | 521/128 |
| 4,956,405 A * | 9/1990 | Wheeler et al. | 524/100 |
| 5,709,954 A * | 1/1998 | Lyden et al. | 428/500 |
| 5,843,268 A * | 12/1998 | Lyden et al. | 156/324.4 |

FOREIGN PATENT DOCUMENTS

| | | |
|---|---|---|
| JP | 07-195622 | 8/1995 |
| JP | 08-505333 | 6/1996 |
| JP | 08-294933 | 11/1996 |
| JP | 08-511741 | 12/1996 |
| JP | 2000-041702 | 2/2000 |

* cited by examiner

*Primary Examiner* — Peter D Mulcahy

(74) *Attorney, Agent, or Firm* — Troutman Sanders LLP; James E. Schutz; Benjamin C. Wiles

(57) ABSTRACT

A method of manufacturing a sole according to the present invention includes the steps of obtaining a rubber part by previously crosslinking a polymer mixture containing 50 to 100 mass % of a diene-based polymer and 0 to 40 mass % of an acrylonitrile component in a polymer component of the polymer mixture, halogenating the rubber part, and bonding the rubber part and thermoplastic resin to each other by molding said thermoplastic resin on said rubber part.

9 Claims, 3 Drawing Sheets

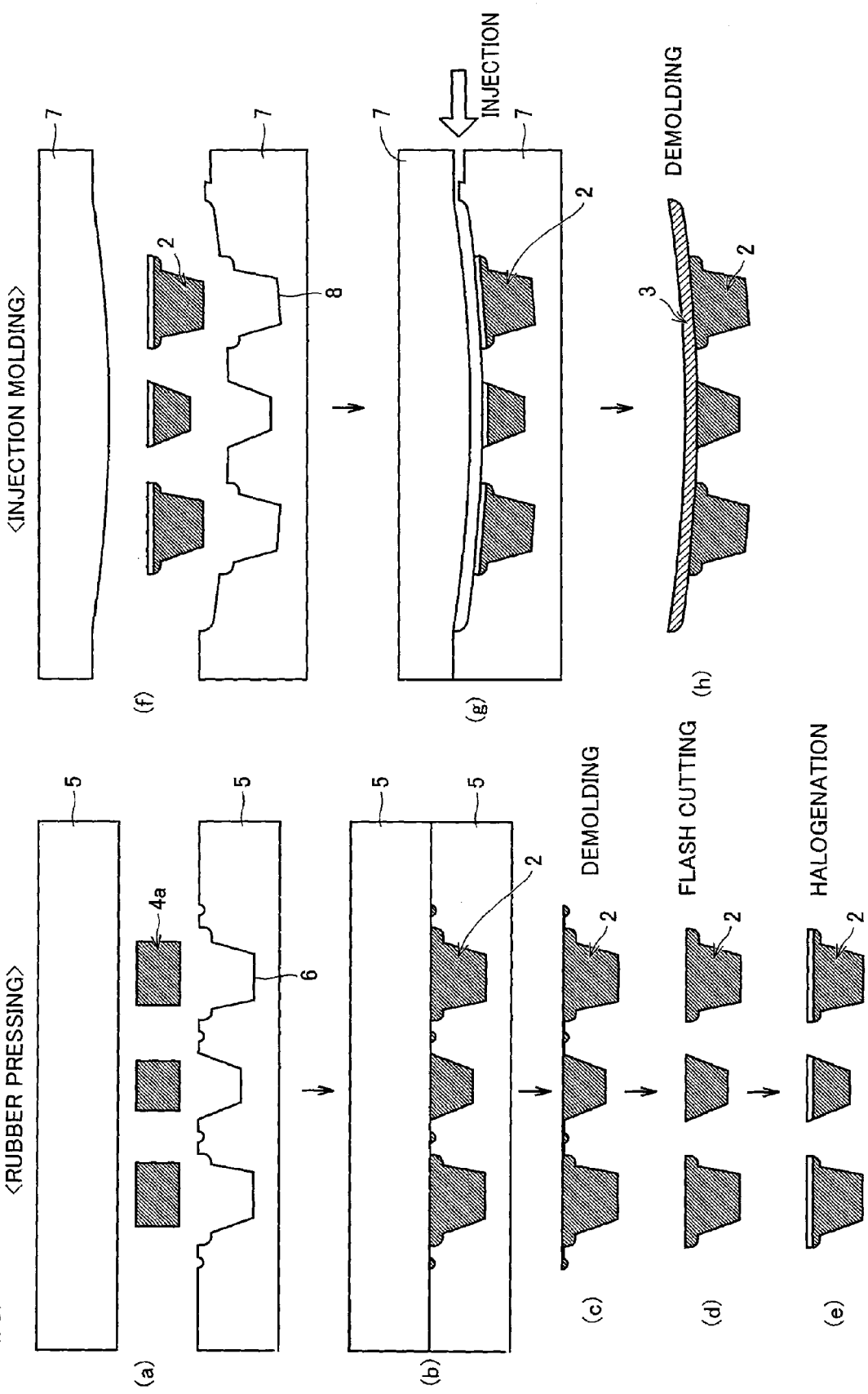

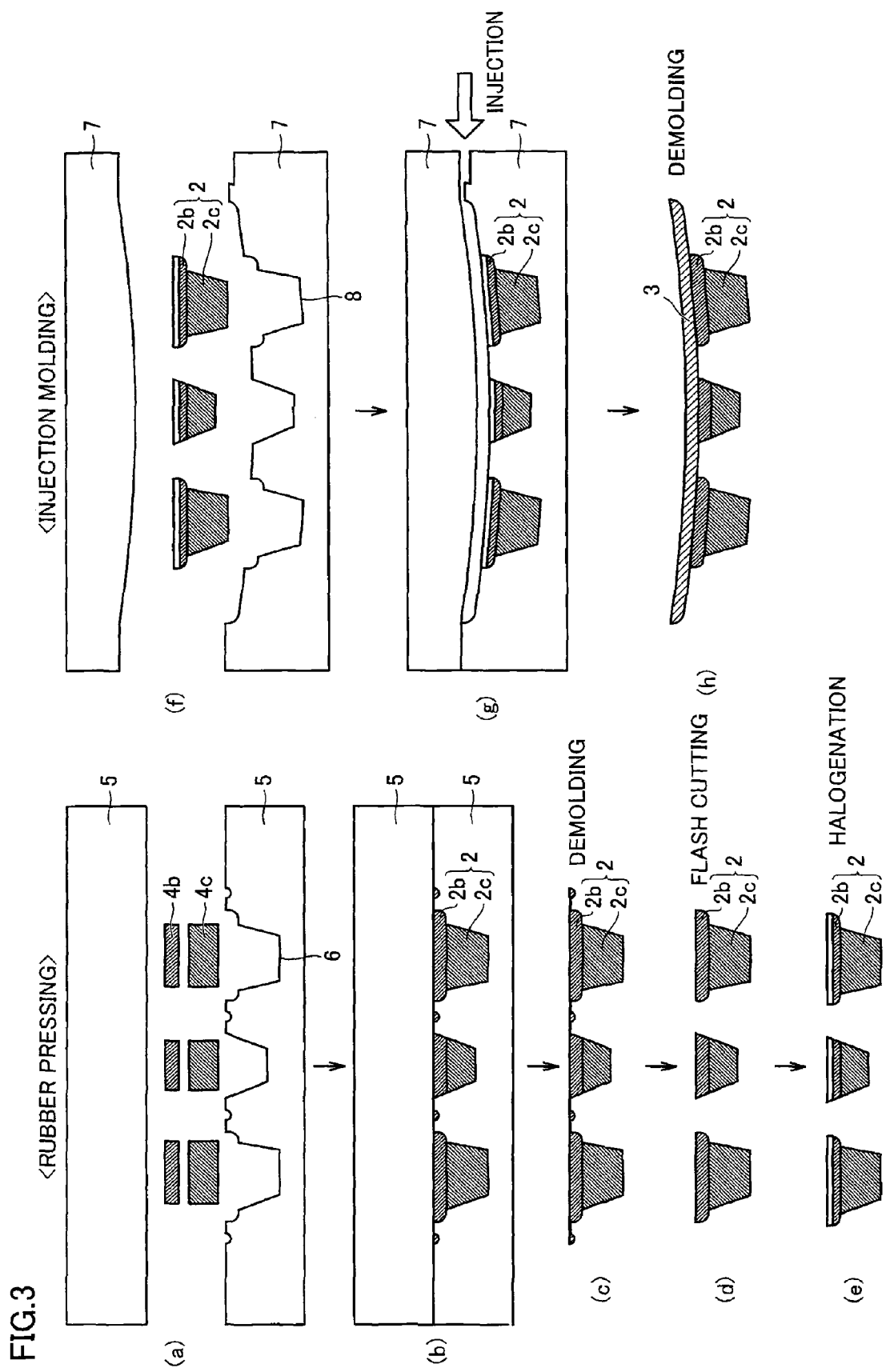

SOLE AND METHOD OF MANUFACTURING SOLE

BACKGROUND OF THE INVENTION

1. Field of the Invention

The present invention relates to a method of manufacturing a sole and a sole obtained by the method.

2. Description of the Background Art

Various types of materials for molding soles are known in the art. For example, Japanese Patent Laying-Open No. 8-294933 (1996) discloses a method of manufacturing a sole of a gym shoe by halogenating the surface of a rubber material and thereafter multicolor-molding the surface of the halogenated rubber material with a thermoplastic material such as a polyurethane elastomer or a polyamide elastomer by compression molding or injection molding.

In Japanese Patent Laying-Open No. 8-294933, however, effects of and conditions for halogenation of the rubber material with a chlorine-based primer or a bromine-based primer are not clearly described. The method according to Japanese Patent Laying-Open No. 8-294933 has not been put into practice, due to insufficient adhesive power.

Japanese Patent Laying-Open No. 7-195622 (1995) discloses a composite product prepared by bonding a thermoplastic material to a thermoplastic elastomer (TPV) obtained by dynamically vulcanizing rubber dispersed into a thermoplastic matrix as particulates, i.e., an article made of a thermoplastic material and TPV. Japanese Patent Laying-Open No. 7-195622 also discloses a method of molding a sole by injecting a TPV alloy (thermoplastic/rubber alloy) onto a sole of polyetheresteramide having high fatigue resistance, a low deformation hysteresis and excellent low-temperature resistance by insertion molding or two-color injection molding.

National Patent Publication Gazette No. 8-505333 (1996) discloses a sole consisting of a two-layer article of a composition containing a lightweight thermoplastic elastomer bonded onto a dense material made of a non-lightweight thermoplastic material selected from a group consisting of polyetheramide, polyetherester and polyurethane.

In the sole consisting of the two-layer article of the composition containing the lightweight thermoplastic elastomer bonded onto the dense material made of the non-lightweight thermoplastic material selected from the group consisting of polyetheramide, polyetherester and polyurethane disclosed in National Patent Publication Gazette No. 8-505333, however, durability of the sole itself may be reduced due to low durability of the lightweight thermoplastic elastomer itself.

National Patent Publication Gazette No. 8-511741 (1996) discloses a composite structure obtained by combining a vulcanized elastomer containing a carboxylic group with a thermoplastic polymer containing a block and a method of manufacturing a sole for a gym shoe by vulcanizing an elastomer on a thermoplastic polymer.

In National Patent Publication Gazette No. 8-511741, however, no specific method of manufacturing a sole is described in detail. If press molding is employed, for example, a flash (coat) of rubber is formed on the thermoplastic polymer, and the method cannot be put into practice in view of the appearance of the manufactured sole.

According to the aforementioned method of manufacturing a sole, further, a molding temperature exceeding a heat distortion temperature is applied to a thermoplastic elastomer sheet, and hence heat distortion and distortion in cooling remain after demolding. In order to prevent this, a molding die for injection-molding a bottom sole must be provided with a cooling apparatus, and hence extremely high-priced and complicated equipment is required. Thus, the method disadvantageously requires a high cost. In this regard, a sole and a method of manufacturing a sole with a material having excellent durability, proper hardness, flexibility, cushioning properties, traction properties and productivity and requiring a low cost have been awaited.

Japanese Patent Laying-Open No. 2000-41702 discloses a sole having a three-layer structure obtained by simultaneously integrally molding a rubber material made of a thermosetting elastic body and a bonding layer made of a thermoplastic elastomer and thereafter injection-molding a base portion made of a thermoplastic elastomer for forming the body of the sole and a method of manufacturing the sole having the three-layer structure.

In the sole having the three-layer structure disclosed in Japanese Patent Laying-Open No. 2000-41702, adhesion between the rubber material and the base portion is sufficiently improved due to the bonding layer interposed therebetween, and dispersion in adhesive power is remarkably reduced. However, the method disclosed in Japanese Patent Laying-Open No. 2000-41702 requires a mold die cooling step, and hence the manufacturing steps are complicated, to result in increase of the manufacturing cost.

SUMMARY OF THE INVENTION

An object of the present invention is to provide a method of manufacturing a sole and a sole improved in adhesion between a rubber part and thermoplastic resin, stabilized in quality and improved in functionality, in order to overcome the aforementioned problems of the prior art and reduce the cost for the sole.

In order to attain the aforementioned object, the present invention provides a method of manufacturing a sole consisting of the following structure and a sole manufactured by the method:

The method of manufacturing a sole according to the present invention includes the steps of obtaining a rubber part by previously crosslinking a polymer mixture containing 50 to 100 mass % of a diene-based polymer and 0 to 40 mass % of an acrylonitrile component in a polymer component of the polymer mixture, halogenating the rubber part, and bonding the rubber part and the thermoplastic resin to each other by molding the thermoplastic resin on the halogenated rubber part.

In the method of manufacturing a sole according to the present invention, the content of the acrylonitrile component in the polymer component of the polymer mixture is preferably 0 to 39 mass %.

In the method of manufacturing a sole according to the present invention, the polymer component of the polymer mixture preferably contains a polyisoprene component and a polybutadiene component by greater than or equal to 70 mass % in total.

In the method of manufacturing a sole according to the present invention, the polymer component of the polymer mixture preferably contains at least 30 mass % of a polyisoprene component.

In the method of manufacturing a sole according to the present invention, the polymer component of the polymer mixture preferably contains at least one element selected from a group consisting of natural rubber, isoprene rubber, butadiene rubber, styrene-butadiene rubber, acrylonitrile-butadiene rubber, high styrene rubber, a 1,2-polybutadiene-based elastomer and a styrene-butadiene-styrene elastomer by 80 to 100 mass % in total.

In the present invention, the rubber part on the thermoplastic resin are preferably bonded to each other by molding the thermoplastic resin on the rubber part within 108 hours after halogenating the rubber part.

The present invention also provides a sole manufactured by the aforementioned method of manufacturing a sole.

According to the present invention, the rubber part and the thermoplastic resin are bonded to each other by previously crosslinking the polymer mixture, thereafter inserting the rubber part halogenated with a chlorine-based primer into a molding die and molding the thermoplastic resin on the rubber part, to require no steps of heating and cooling the molding die. Therefore, the steps of manufacturing the sole are remarkably simplified, to reduce the cost.

According to the present invention, the rubber part is overmolded with the thermoplastic resin after the crosslinking, whereby no flash is formed when the same is composited with the thermoplastic resin. Further, the appearance of the sole can be improved, to remarkably improve the added value of the product.

In addition, the method of manufacturing a sole according to the present invention requires no complicated steps such as those for buffing, application of an adhesive and compression bonding having been required in a conventional method of manufacturing a sole by bonding a rubber part to a surface of thermoplastic resin, whereby the steps of manufacturing the sole are remarkably simplified, to reduce the cost.

According to the present invention, the rubber part and the thermoplastic resin can be more strongly bonded to each other by increasing the quantity of the polybutadiene component or the polyisoprene component. The rubber part and the thermoplastic resin can be so strongly bonded to each other that dispersion in adhesion as well as the number of defectives can be reduced.

While a clearance is formed or adhesive power is dispersed when a rubber material is provided with a complicated three-dimensional curve in a conventional bonding step, homogeneous and strong bonding can be performed according to the present invention.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIGS. 2(a) to 2(h) are sectional views showing a method of manufacturing a sole according to a first embodiment of the present invention; and FIGS. 3(a) to 3(h) are sectional views showing a method of manufacturing a sole according to a second embodiment of the present invention.

DESCRIPTION OF THE PREFERRED EMBODIMENTS

Figure 1:
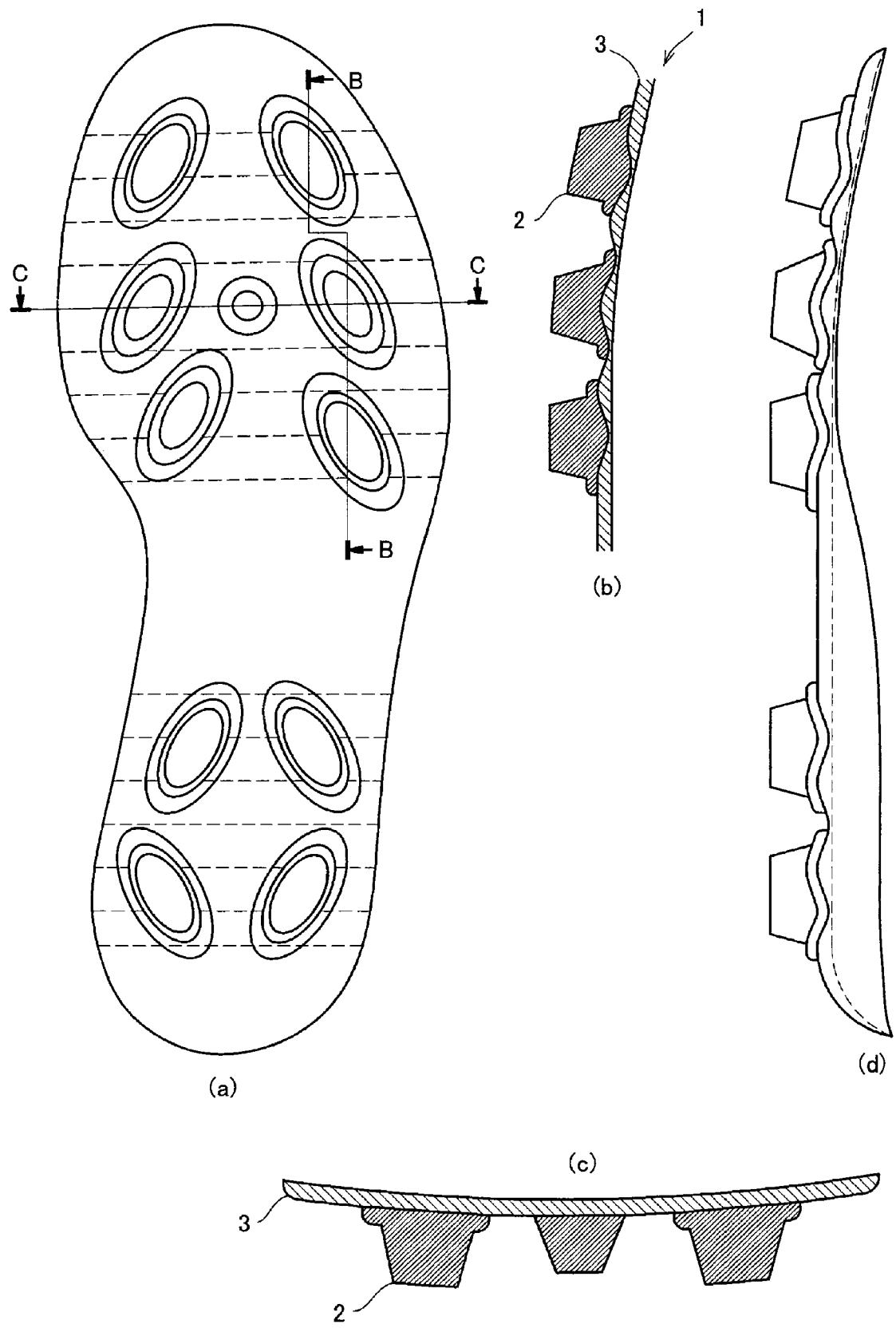
FIG. 1(a) is a plan view of a sole according to an embodiment of the present invention.
FIG. 1(b) is a cross-sectional view taken from line B-B of FIG. 1(a)
FIG. 1(c) is a cross sectional view taken from line C-C of FIG. 1(a) and FIG. 1(d) is a side view of a sole according to an embodiment of the present invention.

An embodiment of the present invention is now described in detail.

<Sole>

FIG. 1(a) is a plan view of a sole according to an embodiment of the present invention, FIG. 1(b) is a cross-sectional view taken from line B-B of FIG. 1(a), FIG. 1(c) is a cross sectional view taken from line C-C of FIG. 1(a) and FIG. 1(d) is a side view of a sole according to an embodiment of the present invention. According to the embodiment of the present invention, sole 1 is constituted of a previously crosslinked rubber part 2 and a base portion 3. Base portion 3 is made of thermoplastic resin, which is bonded to rubber part 2 by molding the thermoplastic resin on the rubber part.

<Rubber Part>

(Polymer Mixture)

In the present invention, the term "polymer mixture" denotes a material prepared by blending various additives such as a crosslinking agent and a filler into a polymer component. Rubber part 2 employed in the embodiment of the present invention is prepared by crosslinking a polymer mixture.

(Polymer Component)

In the present invention, the term "polymer component" denotes a component in the polymer mixture other the additives such as a crosslinking agent and a filler. The polymer component in the polymer mixture for rubber part 2 employed in the embodiment of the present invention contains 50 to 100 mass % of a diene-based polymer and 0 to 40 mass % of an acrylonitrile component. In other words, the polymer component may contain 50 to 100 mass % of the diene-based polymer with no acrylonitrile component, or may contain 50 to 100 mass % of the diene-based polymer and not more than 40 mass % of the acrylonitrile component.

For example, NR (natural rubber), IR (isoprene rubber), BR (butadiene rubber), NBR (acrylonitrile-butadiene rubber), CR (chloroprene rubber), SBR (styrene-butadiene rubber), DR (isoprene-isobutylene rubber), a 1,2-polybutadiene-based elastomer or a styrene-butadiene-styrene elastomer can be employed as the diene-based polymer.

The polymer component contains 50 to 100 mass % of the diene-based polymer. The content of the diene-based polymer is preferably 80 to 100 mass %, more preferably 100 mass %.

In the present invention, the content of the acrylonitrile component in the polymer component forming rubber part 2 indicates the ratio (mass %) of the acrylonitrile component expressed in the following chemical formula (1) to the total quantity of the polymer component:

(1)

The polymer component contains 0 to 40 mass % of the acrylonitrile component. The content of the acrylonitrile component is preferably 0 to 39 mass %, more preferably 0 to 35 mass %.

In the embodiment of the present invention, the polymer component in the polymer mixture preferably also contains the acrylonitrile component. In this case, the content of the acrylonitrile component is preferably not more than 40 mass %, more preferably not more than 39 mass %, and most preferably not more than 35 mass %.

In the present invention, the content of a polyisoprene component in the polymer component forming rubber part 2 indicates the ratio (mass %) of the polyisoprene component expressed in the following chemical formula (2) to the total quantity of the polymer component:

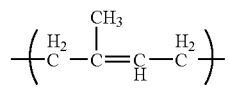

(2)

In the present invention, the content of a polybutadiene component in the polymer component forming rubber part 2 indicates the ratio (mass %) of the polybutadiene component expressed in the following chemical formula (3) to the total quantity of the polymer component:

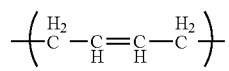

(3)

The polymer component forming rubber part 2 employed in the embodiment of the present invention preferably contains the polyisoprene component and the polybutadiene component by at least 70 mass % in total. In sole 1 according to the present invention, the polymer component more preferably contains the polyisoprene component and the polybutadiene component by at least 80 mass % in total, in order to improve peel strength of rubber part 2 and the thermoplastic resin.

The polymer component forming rubber part 2 preferably contains at least 30 mass % of the polyisoprene component.

When a rubber component containing a large quantity of at least one of a polybutadiene component and a polyisoprene component is employed, rubber part 2 can be easily halogenated with a primer, and can be more strongly bonded to the adjacent thermoplastic resin. Therefore, at least one element selected from a group consisting of NR, IR, BR, SBR, NBR, high styrene rubber (HSR: a kind of SBR), a 1,2-polybutadiene-based elastomer (RB) and a styrene-butadiene-styrene elastomer (SBS) is preferably used as the polymer component.

Further, the polymer component forming rubber part 2 is preferably prepared from at least one polymer selected from a group consisting of NR, IR, BR, SBR and NBR, in consideration of functions such as durability, cushioning properties and gripping properties of sole 1. In order to control hardness of sole 1 or the like, HSR, RB, SBS or the like can be properly blended into the polymer component.

Rubber part 2 is previously crosslinked, and a bonded surface thereof is halogenated with a chlorine-based primer. Rubber part 2 is preferably halogenated by diluting chlorinated organic matter with a proper solvent such as ethyl acetate in a concentration of about 3 to 5%, applying the obtained solution to a sheet for rubber part 2 and thereafter drying the same, so that the surface of the sheet for rubber part 2 can be homogeneously halogenated. The solution can be applied by brush coating or spray coating, for example. While any drying method can be employed so far as the solvent component is evaporated, the solution is properly dried for 10 minutes at ordinary temperature (natural drying) or for 5 to 10 minutes under a temperature condition of 40 to 60° C. causing no deterioration of the rubber. The sheet for rubber part 2 is integrally molded with the thermoplastic resin within 108 hours, preferably within 96 hours, more preferably within 72 hours after the halogenation. The effect of the halogenation is reduced with the lapse of time, and adhesiveness is remarkably reduced after a lapse of 120 hours or more. A bromide-based primer is unpreferable in consideration of reactivity and a long reaction time, i.e., a long molding time. Further, halogenation by dipping is unpreferable since the rubber is deteriorated in portions other than the bonded portions to cause reduction in strength and discoloration.

(Crosslinking Agent)

The crosslinking agent for rubber part 2 employed in the embodiment of the present invention may not be particularly restricted, but sulfur generally employed as a rubber crosslinking agent or an organic peroxide prompting peroxide crosslinking can be employed. While organic peroxides include an alkyl-based peroxide and an acyl-based peroxide, DCP (dicumyl peroxide), 1.1-di-t-butylperoxy-cyclohexane or di-t-butylperoxy-3.3.5-trimethylcyclohexane is preferably employed in particular.

(Other Compounding Agents)

Rubber part 2 employed in the embodiment of the present invention may contain a softener, a white filler, a surface active agent, an antioxidant, a vulcanization accelerator, carbon black and the like.

The softener is employed for improving kneadability if desired, and can be prepared from a petroleum softener such as process oil, lubricating oil, paraffin, liquid paraffin, petroleum asphalt or Vaseline; a fatty oil softener such as castor oil, linseed oil, rapeseed oil or coconut oil; tall oil; a rubber substitute; wax such as beeswax, carnauba wax or lanoline; linoleic acid, palmitic acid, stearic acid or lauric acid. The content of the softener must be so controlled that that same does not gush out on the bonding interface to inhibit the bonding. The content of the softener is preferably set to 0 to 20 parts by mass with respect to 100 parts by mass of the polymer component, for example.

As the white filler, silica, clay, alumina, talc, calcium carbonate, magnesium carbonate, aluminum hydroxide, magnesium hydroxide, magnesium oxide and/or titanium oxide can be employed as a single substance or in a combination of at least two elements. In particular, silica, clay, aluminum hydroxide and/or aluminum is preferably employed as the white filler.

The content of silica is preferably set to 10 to 70 parts by mass with respect to 100 parts by mass of the rubber component.

The surface active agent can be prepared from polyethylene glycol or diethylene glycol, for example, and polyethylene glycol is particularly preferable.

As the antioxidant, an amine-, phenol- or imidazole-based compound, metallic carbamate or wax can be properly selected.

The vulcanization accelerator can be prepared from a material containing at least one of sulfenamide-, thiazol-, thiuram-, thiourea-, guanidine-, dithiocarbamate-, aldehyde-amine-, aldehyde-ammonia-, imidazoline- and xantate-based vulcanization accelerators.

(Structure of Rubber Part)

Rubber part 2 employed in the embodiment of the present invention is described with reference to FIGS. 2(b) to 2(h) and 3(b) to 3(h).

As shown in FIGS. 2(b) to 2(h), rubber part 2 can be constituted of a single layer prepared by crosslinking/molding a single polymer mixture.

Alternatively, rubber part 2 can be constituted of two layers, i.e., an outer layer 2c closer to a grounded surface and an inner layer 2b adjacent to base portion 3 made of thermoplastic resin, as shown in FIGS. 3(b) to 3(h). In this case, inner layer 2b is preferably prepared from rubber made of a polymer mixture, whose polymer component contains 50 to 100 mass % of a diene-based polymer and 0 to 40 mass % of an acrylonitrile component, excellent in bondability to the thermoplastic resin. Further, outer layer 2c is preferably prepared from rubber having excellent characteristics such as wear resistance, gripping properties and oil resistance required to the grounded surface of sole 1. When high oil resistance is required, for example, outer layer 2c can be prepared from rubber whose polymer component contains greater than 40 mass % of an acrylonitrile component and inner layer 2b can be prepared from rubber whose polymer component contains less than 40 mass %, more preferably less than 39 mass % of an acrylonitrile component in order to attain bondability to base portion 3 in rubber part 2 having the two-layer structure.

The thickness of rubber part 2 is preferably 1.0 to 20.0 mm. If the thickness of rubber part 2 is smaller than 1.0 mm, it may be difficult to simultaneously mold the same with the thermoplastic resin, and the rubber may be deteriorated due to heat in injection. If the thickness of rubber part 2 is larger than 20.0 mm, on the other hand, the degree of crosslinking is unpreferably varied with the outer portion and the inner portion thereof. When rubber part 2 is constituted of outer layer 2c and inner layer 2b, the thicknesses of outer layer 2c and inner layer 2b are preferably 0.5 to 19.5 mm and 0.5 to 5.0 mm respectively.

<Thermoplastic Resin>

The thermoplastic resin for forming base portion 3 of sole 1 according to the embodiment of the present invention can be prepared from polyamide resin, polyurethane resin, polyolefin resin, polystyrene resin, polyvinyl chloride resin, polyester resin or chlorinated polyethylene resin, or a foam of such resin. The foam of the resin is prepared by a method utilizing a blowing agent such as a volatile blowing agent or a decomposable blowing agent or a method utilizing a microballoon. Alternatively, the thermoplastic resin can be prepared from a polyamide elastomer, a polyurethane elastomer, a polyolefin elastomer (an EVA-based elastomer, a polyethylene elastomer or a polypropylene elastomer), a polystyrene-based elastomer, a polyvinyl chloride-based elastomer, a polyester elastomer or a 1,2-polybutadiene-based elastomer.

In particular, polyamide resin, a polyamide elastomer, polyurethane resin or a polyurethane elastomer is preferably employed, in order to attain higher adhesive power to rubber part 2.

<Method of Manufacturing Sole>

First and second embodiments of a method of manufacturing a sole according to the present invention are now described with reference to FIGS. 2(a) to 2(h) and 3(a) to 3(h).

[First Embodiment]

The first embodiment of the present invention is described with reference to FIGS. 2(a) to 2(h).

(Preparation of Rubber Part)

First, a rubber part material 4a prepared by die-cutting a kneaded/rolled sheet of an uncrosslinked polymer mixture is set in a recess 6 of a rubber part molding die 5 and press-heated (at a temperature of 150 to 160° C.) (FIGS. 2(a) and 2(b)). When rubber part material 4a is crosslinked, molding die 5 is opened. While the mold opening time varies with the composition of the polymer mixture and must be controlled in response to the thickness and the shape of a molded substance, molding die 5 is preferably opened within 3 to 8 minutes after starting the press heating in the case of a general sole.

Then, rubber part 2 is demolded, and flashes are cut if necessary (FIGS. 2(c) and 2(d)).

(Halogenation)

Then, a surface of rubber part 2 prepared in the aforementioned step for coming into contact with base portion 2 is halogenated with a chlorine-based primer (FIG. 2(e)). The halogenation is performed by diluting chlorinated organic matter with a proper solvent in a concentration of about 3 to 5%, applying the obtained solution to rubber part 2 and thereafter drying the same.

(Molding Thermoplastic Resin on Rubber Part)

Then, rubber part 2 halogenated in the aforementioned step is set in a rubber part recess 8 of a sole injection molding die 7, which in turn is closed (FIG. 2(f)). Then, the thermoplastic resin is molded on rubber part 2 (FIG. 2(g)).

Rubber part 2 and the thermoplastic resin are bonded to each other by injection molding. When a polyamide elastomer is employed, for example, the injection molding is preferably performed for 5 to 20 seconds in the temperature range of 180 to 290° C. in the case of a general sole. The injection molding conditions must be controlled in response to the materials for rubber part 2 and the thermoplastic resin, the crosslinking temperature of the rubber, the melting temperature of the thermoplastic resin, the thickness and the shape of the molded substance etc. The injection molding is so performed that halogenated functional groups in rubber part 2 and the thermoplastic resin are bonded to each other and strong adhesiveness can be attained.

[Second Embodiment]

Referring to FIGS. 3(a) to 3(h), rubber part 2 can be constituted of outer layer 2c closer to the grounded surface and inner layer 2b adjacent to the thermoplastic resin in response to the characteristics required to sole 1 in a second embodiment of the present invention. In this case, inner layer 2b is prepared from rubber bondable to a layer of the thermoplastic resin, while outer layer 2c is prepared from rubber excellent in wear resistance and gripping properties and bondable to inner layer 2b. A method of manufacturing sole 1 with rubber part 2 having the two-layer structure is described with reference to FIGS. 3(a) to 3(h).

(Preparation of Rubber Part)

First, an outer layer rubber part material 4c prepared by die-cutting a kneaded/rolled sheet of uncrosslinked rubber employed for outer layer 2c is set in a recess 6 of a rubber part molding die 5 (FIG. 3(a)). Then, an inner layer rubber part material 4b prepared by die-cutting a kneaded/rolled sheet of uncrosslinked rubber employed for inner layer 2b is arranged on outer layer rubber part material 4c and press-heated (at a temperature of 150 to 160° C. (FIG. 3(b)), and molding die 5 is opened when inner layer rubber part material 4b and outer layer rubber part material 4c are crosslinked, to obtain rubber part 2. While the mold opening time varies with the composition of the polymer mixture and must be controlled in response to the thickness and the shape of a molded substance, molding die 5 is preferably opened within 3 to 8 minutes after starting the press heating in the case of a general sole.

(Halogenation)

Then, a surface of rubber part 2 prepared in the aforementioned step for coming into contact with base portion 3 is halogenated with a chlorine-based primer (FIG. 3(e)). The halogenation is performed by diluting chlorinated organic matter with a proper solvent in a concentration of about 3 to 5%, applying the obtained solution to inner layer 2b of rubber part 2 and thereafter drying the same.

(Molding Thermoplastic Resin on Rubber Part)

Then, rubber part 2 halogenated in the aforementioned step is set in a rubber part recess 8 of a sole injection molding die 7, which in turn is closed (FIG. 3(f)). Then, the thermoplastic resin is molded on rubber part 2 (FIG. 3(g)).

Rubber part 2 and the thermoplastic resin are bonded to each other by injection molding. When a polyamide elastomer is employed, for example, the injection molding is preferably performed for 5 to 20 seconds in the temperature range of 180 to 290° C. in the case of a general sole. The injection molding conditions must be controlled in response to the materials for rubber part 2 and the thermoplastic resin, the crosslinking temperature of the rubber, the melting temperature of the thermoplastic resin, the thickness and the shape of the molded substance etc. The injection molding is so performed that halogenated functional groups in rubber part 2 and the thermoplastic resin are bonded to each other and strong adhesiveness can be attained.

EXAMPLES

Examples 1 to 12 and Comparative Examples 1 to 5

(Preparation of Rubber Part Sheet)

In each of Examples 1 to 12 and comparative examples 1 to 5, a polymer mixture obtained by blending compounding agents according to Table 2 is kneaded to prepare a rolled sheet of 2 mm in thickness as a rubber part sheet. The rolled sheet is set in a recess of a rubber part molding die and press-heated under proper crosslinking conditions, and the obtained rubber part sheet is demolded. At this time, the crosslinking temperature and the crosslinking time are set from a crosslinking measurement tester such as a JSR curast meter.

(Halogenation of Rubber Part)

Then, a surface of the rubber part sheet prepared in the aforementioned step to be bonded to a base portion is halogenated by applying a solvent prepared by diluting chlorinated organic matter (U-PLY 5 by Hirono Chemical Industries Co., Ltd) with ethyl acetate in a concentration of about 3% to the same as a halogenator by brush coating and thereafter drying the same. Referring to Table 2, "Y" denotes halogenated samples, and "N" denotes non-halogenated samples.

(Molding Thermoplastic Resin on Rubber Part)

Then, the rubber part sheet prepared in the aforementioned step is set in a recess (3.5 mm in depth) of a thermoplastic resin test sheet molding die, which in turn is closed. Thereafter a polyamide elastomer (PEBAX 6333 by Arkema Inc.) is injection-molded as thermoplastic resin at a molding temperature of 260° C. for an injection time of 10 seconds (thickness: 1.5 mm). The rubber part sheet and the thermoplastic resin are held for 25 seconds after the injection, and thereafter demolded.

As to a rubber/thermoplastic resin composite test sheet (200 mm by 50 mm by 3.5 mm) obtained in this manner, peel strength and a material breaking ratio are measured.

(Measuring Method)

The peel strength is measured by a testing method according to "JIS K 6256-1993 Adhesion Test Method of Vulcanized Rubber" at a peel rate of 50 mm/min.

The material breaking ratio is determined with reference to Table 1 by observing a peeled surface after the aforementioned measurement of the peel strength and calculating the ratio (%) of breakage of a rubber layer with respect to the total area of the peeled surface.

TABLE 1

| | Material Breaking Ratio | | | |
|---|---|---|---|---|
| | 0-10 | 10-20 | 20-90 | 90-100 |
| Determination | D | C | B | A |

Table 2 shows the measurement results of Examples 1 to 12 and comparative examples 1 to 5.

TABLE 2

| | | Example | | | | | | | | |
|---|---|---|---|---|---|---|---|---|---|---|
| | | 1 | 2 | 3 | 4 | 5 | 6 | 7 | 8 | 9 |
| Blending (parts by mass) | NR | 50 | 50 | 50 | 50 | 40 | 30 | 20 | — | 30 |
| | BR | 50 | 50 | — | — | — | — | — | 25 | 70 |
| | NBR | — | — | 50 | — | 10 | 20 | 30 | 75 | — |
| | EPDM | — | — | — | 50 | 50 | 50 | 50 | — | — |
| | Silica | 30 | 30 | 30 | 30 | 30 | 30 | 30 | 30 | 40 |
| | Stearic Acid | 1.5 | 1.2 | 1.2 | 1.2 | 1.2 | 1.2 | 1.2 | 1.2 | 1.5 |
| | Surface Active Agent | 2 | 2 | 2 | 2 | 2 | 2 | 2 | 2 | 2.5 |
| | Antioxidant | — | 1 | 1 | — | — | — | — | 1 | 1 |
| | Peroxide Crosslinking Agent D | 3 | — | 4 | — | — | — | — | 5 | — |
| | Peroxide Crosslinking Agent T | — | — | — | 5 | 5 | 5 | 5 | — | — |
| | Sulfur | — | 1.6 | — | — | — | — | — | — | 1.5 |
| | Vulcanization Accelerator DM | — | 1.2 | — | — | — | — | — | — | 1.6 |
| | Vulcanization Accelerator M | — | 0.6 | — | — | — | — | — | — | 0.8 |
| | Vulcanization Accelerator TS | — | 0.2 | — | — | — | — | — | — | 0.3 |
| Ratio in Polymer Component (mass %) | Diene-Based Polymer | 100 | 100 | 100 | 50 | 50 | 50 | 50 | 100 | 100 |
| | Acrylonitrile Component | 0 | 0 | 20 | 0 | 4 | 8 | 12 | 31 | 0 |
| | Polyisoprene Component | 50 | 50 | 50 | 50 | 40 | 30 | 20 | 0 | 30 |
| | Polybutadiene Component | 50 | 50 | 30 | 0 | 6 | 12 | 18 | 69 | 70 |
| | Sum of Polyisoprene Component and Polybutadiene Component | 100 | 100 | 80 | 50 | 46 | 42 | 38 | 69 | 100 |
| Halogenation | Halogenation | Y | Y | Y | Y | Y | Y | Y | Y | Y |
| | Elapsed Time (h) after Halogenation | 1 | 1 | 1 | 1 | 1 | 1 | 1 | 1 | 1 |
| Results of Evaluation | Peel Strength (N/cm) | 60 | 76 | 81 | 55 | 53 | 50 | 20 | 35 | 87 |
| | Material Breaking Ratio | 100 | 100 | 100 | 70 | 70 | 50 | 20 | 10 | 100 |
| | Determination | A | A | A | B | B | B | C | C | A |

TABLE 2-continued

|  |  | Example | | | Comparative Example | | | | |
| --- | --- | --- | --- | --- | --- | --- | --- | --- | --- |
|  |  | 10 | 11 | 12 | 1 | 2 | 3 | 4 | 5 |
| Blending (parts by mass) | NR | — | 20 | 20 | — | 20 | — | — | 50 |
|  | BR | 5 | — | — | — | — | 40 | — | 50 |
|  | NBR | 95 | 30 | 30 | — | — | — | 100 | — |
|  | EPDM | — | 50 | 50 | 100 | 80 | 60 | — | — |
|  | Silica | 30 | 30 | 30 | 30 | 30 | 30 | 30 | 30 |
|  | Stearic Acid | 1.2 | 1.2 | 1.2 | 1.2 | 1.2 | 1.2 | 1.2 | 1.5 |
|  | Surface Active Agent | 2 | 2 | 2 | 2 | 2 | 2 | 2 | 2 |
|  | Antioxidant | 1 | — | — | — | — | — | 1 | — |
|  | Peroxide Crosslinking Agent D | 5 | — | — | — | — | — | 5 | 3 |
|  | Peroxide Crosslinking Agent T | — | 5 | 5 | 8 | 6 | 6 | — | — |
|  | Sulfur | — | — | — | — | — | — | — | — |
|  | Vulcanization Accelerator DM | — | — | — | — | — | — | — | — |
|  | Vulcanization Accelerator M | — | — | — | — | — | — | — | — |
|  | Vulcanization Accelerator TS | — | — | — | — | — | — | — | — |
| Ratio in Polymer Component (mass %) | Diene-Based Polymer | 100 | 50 | 50 | 0 | 20 | 40 | 100 | 100 |
|  | Acrylonitrile Component | 39 | 12 | 12 | 0 | 0 | 0 | 41 | 0 |
|  | Polyisoprene Component | 0 | 20 | 20 | 0 | 20 | 0 | 0 | 50 |
|  | Polybutadiene Component | 61 | 18 | 18 | 0 | 0 | 40 | 59 | 50 |
|  | Sum of Polyisoprene Component and Polybutadiene Component | 61 | 38 | 38 | 0 | 20 | 40 | 59 | 100 |
| Halogenation | Halogenation | Y | Y | Y | Y | Y | Y | Y | N |
|  | Elapsed Time (h) after Halogenation | 1 | 96 | 120 | 1 | 1 | 1 | 1 | — |
| Results of Evaluation | Peel Strength (N/cm) | 20 | 18 | 8 | ≈0 | 2 | 5 | ≈0 | ≈0 |
|  | Material Breaking Ratio | 10 | 20 | 10 | 0 | 0 | 0 | 0 | 0 |
|  | Determination | C | C | C | D | D | D | D | D |

(note 1)
NR: SVR-3L from Vietnam
(note 2)
BR: BR01 by JSR Corporation
(note 3)
NBR: NBR220S by JSR Corporation
(note 4)
EPDM: EP21 by JSR Corporation
(note 5)
silica: Ultrasil Vn3 by Evonik Degussa
(note 6)
stearic acid: bead stearic acid by Nippon Oil and Fats Co., Ltd.
(note 7)
surface active agent: PEG4000 by Zenyaku Kogyo Co., Ltd.
(note 8)
antioxidant: Nocrack SP by Ouchi Shinko Chemical Industrial
(note 9)
peroxide crosslinking agent D: Kayaku Mill D-40C by Kayaku Akuzo Co., Ltd.)
(note 10)
peroxide crosslinking agent T: Trigonox 22-40D by Kayaku Akuzo Co., Ltd.)
(note 11)
sulfur: powdered sulfur (200 meshes) by Hosoi Chemical industry Co., Ltd.
(note 12)
vulcanization accelerator DM: Nocrack DM by Ouchi Shinko Chemical Industrial
(note 13)
vulcanization accelerator M: Nocrack M by Ouchi Shinko Chemical Industrial
(note 14)
vulcanization accelerator TS: Nocrack TS by Ouchi Shinko Chemical Industrial (Results of Evaluation)

In Example 1, the polymer component of the rubber part polymer mixture consists of 100 mass % of a diene-based polymer. This polymer component contains about 50 mass % of the polyisoprene component and about 50 mass % of the polybutadiene component. The polymer mixture is peroxide-crosslinked. The obtained rubber/thermoplastic resin composite test sheet has sufficient peel strength and a sufficient material breaking ratio.

In Example 2, the polymer component of the rubber part polymer mixture consists of 100 mass % of the diene-based polymer. This polymer component contains about 50 mass % of the polyisoprene component and about 50 mass % of the polybutadiene component. The polymer mixture is sulfur-crosslinked. The obtained rubber/thermoplastic resin composite test sheet has excellent peel strength and an excellent material breaking ratio.

In Example 3, the polymer component of the rubber part polymer mixture consists of 100 mass % of the diene-based polymer. This polymer component contains about 20 mass % of the acrylonitrile component, about 50 mass % of the polyisoprene component and about 30 mass % of the polybutadiene component. The polymer mixture is peroxide-crosslinked. The obtained rubber/thermoplastic resin composite test sheet has excellent peel strength and an excellent material breaking ratio.

In Example 4, the polymer component of the rubber part polymer mixture contains 50 mass % of the diene-based polymer. This polymer component contains about 50 mass % of the polyisoprene component. The polymer mixture is peroxide-crosslinked. The obtained rubber/thermoplastic resin composite test sheet has sufficient peel strength, while the material breaking ratio thereof is slightly reduced as compared with Examples 1 to 3.

In Example 5, the polymer component of the rubber part polymer mixture contains 50 mass % of the diene-based polymer. This polymer component contains about 4 mass % of the acrylonitrile component, about 40 mass % of the polyisoprene component and about 6 mass % of the polybutadiene component. The polymer mixture is peroxide-crosslinked. The obtained rubber/thermoplastic resin composite test sheet has sufficient peel strength, while the material breaking ratio thereof is slightly reduced as compared with Examples 1 to 3.

In Example 6, the polymer component of the rubber part polymer mixture contains 50 mass % of the diene-based polymer. This polymer component contains about 8 mass % of the acrylonitrile component, about 30 mass % of the polyisoprene component and about 12 mass % of the polybutadiene component. The polymer mixture is peroxide-crosslinked. The obtained rubber/thermoplastic resin composite test sheet has sufficient peel strength, while the material breaking ratio thereof is slightly reduced as compared with Examples 1 to 3.

In Example 7, the polymer component of the rubber part polymer mixture contains 50 mass % of the diene-based polymer. This polymer component contains about 12 mass % of the acrylonitrile component, about 20 mass % of the polyisoprene component and about 18 mass % of the polybutadiene component. The polymer mixture is peroxide-crosslinked. The obtained rubber/thermoplastic resin composite test sheet has peel strength excellent but inferior to those of Examples 1 to 6, while the material breaking ratio thereof is reduced below those of Examples 1 to 6.

In Example 8, the polymer component of the rubber part polymer mixture consists of 100 mass % of the diene-based polymer. This polymer component contains about 31 mass % of the acrylonitrile component and about 69 mass % of the polybutadiene component. The polymer mixture is peroxide-crosslinked. The obtained rubber/thermoplastic resin composite test sheet has peel strength and a material breaking ratio both excellent but inferior to those of Examples 1 to 6.

In Example 9, the polymer component of the rubber part polymer mixture consists of 100 mass % of the diene-based polymer. This polymer component contains about 30 mass % of the polyisoprene component and about 70 mass % of the polybutadiene component. The polymer mixture is sulfur-crosslinked. The obtained rubber/thermoplastic resin composite test sheet has excellent peel strength and an excellent material breaking ratio.

In Example 10, the polymer component of the rubber part polymer mixture consists of 100 mass % of the diene-based polymer. This polymer component contains about 39 mass % of the acrylonitrile component and about 61 mass % of the polybutadiene component. The polymer mixture is peroxide-crosslinked. The obtained rubber/thermoplastic resin composite test sheet has peel strength excellent but inferior to those of Examples 1 to 6, while the material breaking ratio thereof is reduced below those of Examples 1 to 6.

In each of Examples 7, 11 and 12 related to elapsed times after halogenation, the polymer component of the rubber part polymer mixture contains 50 mass % of the diene-based polymer. This polymer component contains about 12 mass % of the acrylonitrile component, about 20 mass % of the polyisoprene component and about 18 mass % of the polybutadiene component. The polymer mixture is peroxide-crosslinked. In Example 7, the rubber part polymer mixture is coalesced/molded with the thermoplastic resin after a lapse of 1 hour from halogenation, and has sufficient peel strength and a sufficient material breaking ratio. In Example 11, the rubber part polymer mixture is coalesced/molded with the thermoplastic resin after a lapse of 96 hours from halogenation, and has sufficient peel strength and a sufficient material breaking ratio although the peel strength tends to slightly lower as compared with Example 7. In Example 12, on the other hand, the rubber part polymer mixture is coalesced/molded with the thermoplastic resin after a lapse of 120 hours from halogenation, the effect of which is reduced as compared with Example 7, to reduce the peel strength and the material breaking ratio.

In comparative example 1, the polymer component of the rubber part polymer mixture contains no diene-based polymer. In comparative example 2, the polymer component of the rubber part polymer mixture contains 20 mass % of the diene-based polymer. In comparative example 3, the polymer component of the rubber part polymer mixture contains 40 mass % of the diene-based polymer. The rubber part polymer mixture according to each of comparative examples 1 to 3 is peroxide-crosslinked, but exhibits no sufficient peel strength. In comparative example 4, the polymer component of the rubber part polymer mixture consists of 100 mass % of the diene-based polymer, but exhibits insufficient peel strength due to about 41 mass of the acrylonitrile component contained therein.

In comparative example 5, the rubber part polymer mixture having the same composition as that of Example 1 exhibits insufficient peel strength and an insufficient material breaking ratio since no halogenation is performed thereon.

Although the present invention has been described and illustrated in detail, it is clearly understood that the same is by way of illustration and example only and is not to be taken by way of limitation, the scope of the present invention being interpreted by the terms of the appended claims.

What is claimed is:

1. A method of manufacturing a sole comprising a rubber part and a thermoplastic resin base, the method comprising the steps of:
   molding a rubber part by crosslinking a polymer mixture containing 50 to 100 mass % of a diene-based polymer and 0 to 40 mass % of an acrylonitrile component in a polymer component of said polymer mixture, said molded rubber part comprising a plurality of surfaces;
   using an applicator to apply a halogenating agent such that only the surfaces of said rubber part that will be bonded to the thermoplastic resin base receive the halogenating agent; and
   bonding said rubber part and the thermoplastic resin base to each other by:
      placing said rubber part in an injection mold such that there are substantially no gaps between a surface of the rubber part that will not be bonded to thermoplastic resin and the injection mold; and
      injection molding said thermoplastic resin on said surfaces of said rubber part that received the halogenating agent.

2. The method of manufacturing a sole according to claim 1, wherein said polymer component contains 0 to 39 mass % of said acrylonitrile component.

3. The method of manufacturing a sole according to claim 1, wherein said polymer component contains a polyisoprene component and a polybutadiene component by greater than or equal to 70 mass % in total.

4. The method of manufacturing a sole according to claim 1, wherein said polymer component contains greater than or equal to 30 mass % of a polyisoprene component.

5. The method of manufacturing a sole according to claim 1, wherein said polymer component contains at least one element selected from a group consisting of natural rubber, isoprene rubber, butadiene rubber, styrene-butadiene rubber, acrylonitrile-butadiene rubber, high styrene rubber, a 1,2- polybutadiene-based elastomer and a styrene-butadiene-styrene elastomer by 80 to 100 mass % in total.

6. The method of manufacturing a sole according to claim 1, bonding said rubber part and said thermoplastic resin to each other by molding said thermoplastic resin on said rubber part within 108 hours after halogenating said rubber part.

7. A sole manufactured by the method of manufacturing a sole according to claim 1.

8. The method of manufacturing a sole according to claim 1, wherein the applicator is a brush.

9. The method of manufacturing a sole according to claim 1, wherein the applicator is a spray device.

* * * * *